D. MENDENHALL.
Tree-Protector.
No. 58,866. Patented Oct. 16, 1866
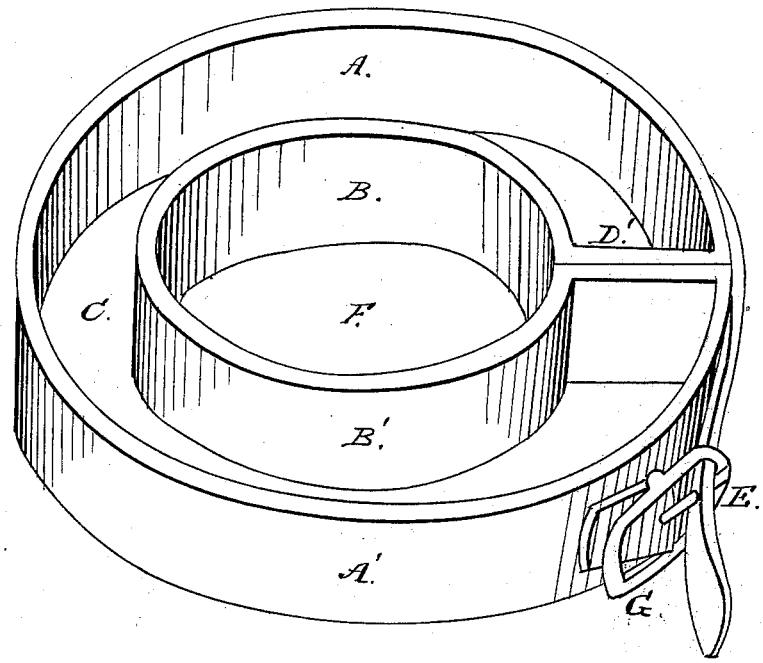

UNITED STATES PATENT OFFICE.

DANIEL MENDENHALL, OF FAIRFIELD, IOWA.

IMPROVEMENT IN TREE-PROTECTORS.

Specification forming part of Letters Patent No. 58,866, dated October 16, 1866.

*To all whom it may concern:*

Be it known that I, DANIEL MENDENHALL, of Fairfield, Jefferson county, State of Iowa, have invented certain new and useful Improvements in Apparatus for the Protection of Fruit-Trees; and I do hereby declare the following to be a full and clear description of the same, reference being had to the drawing which accompanies this specification and form a part thereof, and to the letters of reference marked thereon.

Figure 1 in the drawing is a perspective view of my apparatus as prepared for attaching to a fruit-tree.

The nature of my invention consists in the application to a fruit-tree of an elastic annular trough or water-receptacle, made of india-rubber or other suitable material, the flexible nature of which will accommodate itself to the irregularities and inequalities of the tree, preventing the passage of insects or vermin between the tree and the apparatus, while the trough or receptacle is filled with water or other desirable fluid, which effectually prevents any passage on the outer surface.

To enable those skilled in the art to use and construct my apparatus, I will proceed to describe the same.

A A' represent the outer side of the trough or water-receptacle, and B B' the inner side of the same. C is the bottom of the trough, and D D' are the ends, which come together with a beveled edge. The strap E is fastened to one end of the annular trough, and the buckle G to the opposite end of the same, for securing the apparatus to the tree, as desired; and F represents the hole or opening occupied by the body of the tree.

Having thus described my said invention, what I claim as new, and desire to secure by Letters Patent, is—

The arrangement and combination of the parts herein described, constituting a fruit-tree protector, substantially as set forth and described.

DANIEL MENDENHALL.

Witnesses:
WM. T. DENNIS,
WIGHT LANCASTER.